_United States Patent Office_

3,547,838
Patented Dec. 15, 1970

3,547,838
METHOD FOR PRODUCING CELLULAR PLASTIC ARTICLES AND THE ARTICLES PRODUCED THEREBY
Eugene R. Moore, Midland, Dale M. Pickelman, Auburn, and Robert L. Zimmerman, Midland, Mich., assignors to The Dow Chemical Company, Midland, Mich., a corporation of Delaware
No Drawing. Filed Aug. 10, 1967, Ser. No. 659,605
Int. Cl. C08f 47/10
U.S. Cl. 260—2.5         7 Claims

ABSTRACT OF THE DISCLOSURE

Thermoplastic vinyl aromatic copolymers having a solubility parameter between 9.3 and 9.9 can be foamed to stable cellular articles with Freon 11 as the volatile foaming agent. The solubility parameter of polystyrene can be increased to the above range by copolymerizing styrene with a monomer, such as maleic anhydride, which has a higher solubility parameter than styrene. The copolymers overcome the problem of using Freon 11 with polystyrene (foaming agent too soluble) and overcome the problem of using n-pentane as a foaming agent (flammability).

---

This invention relates generally to the preparation of cellular plastic articles and more particularly to a method for producing said articles from certain monovinyl aromatic copolymer compositions utilizing trichlorofluoromethane as a volatile foaming agent.

It is known to prepare cellular plastic articles by extruding a mobile gel of a thermoplastic resin, such as polystyrene, having a normally gaseous agent such as n-pentane, methyl chloride and the like dissolved therein under pressure, from a pressurizing chamber through an orifice, etc. to a zone of lower pressure. Upon release of the pressure the normally gaseous agent vaporizes and expands the resin to form a stable cellular body.

The cellular plastic can be produced in a variety of shapes, such as a "log" which can be sawed or cut into boards, blocks, etc., and is particularly useful when produced as a thin sheet as is disclosed in U.S. 3,231,524.

While a variety of volatile foaming agents have been indicated to be useful in the preparation of expanded cellular plastic articles from polystyrene, most of them fail to produce a product with a homogeneous cell of a proper size. One foaming agent particularly useful with polystyrene is n-pentane; however n-pentane is flammable and for this reason elaborate and expensive precautions must be taken. Further, the residual n-pentane in the product limits the usefulness of the product in certain applications by virtue of this flammability.

It would be desirable to use the various volatile halogenated hydrocarbons as foaming agents to avoid the above flammability problems and the associated extra costs and precautions. However these halogenated hydrocarbons are not capable of making good foam with polystyrene. For example, trichlorofluoromethane (Freon 11) has a vapor-temperature relationship similar to n-pentane and would be expected to be useful in preparing polystyrene foam except that Freon 11 is too soluble in polystyrene and as a result the foam produced has a non-uniform and excessively large cell size. On the other hand a foaming agent, such as dichlorodifluoromethane, (Freon 12) which has the right solubility characteristics with polystyrene unfortunately is much too volatile resulting in very rapid foaming and an excessively small cell size. The rapid foaming cools the product too soon after extrusion which results in excessive "cold working" making the product tough in one direction but brittle and prone to cracking in the opposite direction.

Accordingly this invention provides a method which advantageously utilizes Freon 11, a non-flammable volatile foaming agent having a vapor pressure-temperature relationship similar to n-pentane. Further the invention provides for thermoplastic resin compositions having sufficient solubility for Freon 11 to produce cellular articles having a uniform, medium cell size. The method of this invention comprises heating and extruding into a region of lower pressure, a foamable composition comprising Freon 11 as the volatile foaming agent and a copolymer which contains in chemically combined form a monovinyl nonhalogen substituted aromatic monomer of the benzene series with an amount of a comonomer sufficient to provide a copolymer having a solubility parameter between about 9.3 and 9.9. As the heated copolymer composition leaves the extrusion orifice the foaming agent volatilizes and expands the copolymer composition to form a stable cellular article.

In order to utilize the favorable vapor pressure-temperature characteristics of Freon 11, it must have an appropriate solubility in the thermoplastic resin. As already discussed it is too soluble in polystyrene; however, by copolymerizing styrene with a monomer having a higher solubility parameter, the solubility parameter of the copolymer can be increased to a range of about 9.3 to about 9.9 which means that the copolymer will be less soluble than polystyrene in non-polar (non-hydrogen bonded) solvents such as Freon 11.

The solubility parameter of most solvents can be readily calculated from thermodynamic data, but the solubility parameter of a polymer is not readily determined directly since a polymer cannot normally be vaporized without decomposition. Solubility parameter, as used in this application, is determined by the following method:

A 0.3% by weight solution of the polymer in methyl ethyl ketone (MEK) is prepared. A high and a low solubility parameter nonsolvent are added to separate portions of the polymer solution until a cloud point is reached. The solubility parameter is then calculated for each mixture and the mid-point between these two values is assumed to be the solubility parameter of the polymer. The method and calculations are explained in the article by D. H. Clarke and K. W. Suh which appeared in J. of Polymer Sci., vol. 5, Part A-1, July 1967.

By this technique polystyrene has a solubility parameter of about 9.1–9.2. According to this invention the solubility parameter of the thermoplastic resin must be raised by about 0.1 to 0.7 unit from this value of 9.1–9.2 in order that Freon 11 may be satisfactorily used.

Monomers having a higher solubility parameter than styrene and suitable for use in this invention include acrylonitrile, methyl acrylate or methacrylate, methacryonitrile, maleimide, acrylic and methacrylic acid, $\alpha,\beta$-unsaturated cyclic anhydrides and their hydrolyzed alkali metal salts, and mono-and dichlorostyrene. The cyclic anhydrides include maleic anhydride, itaconic anhydride and the like.

The copolymers of this invention have a solubility parameter of about 9.3 to 9.9 and are obtained by copolymerizing a monovinyl non-halogen substituted aromatic monomer of the benzene series with a sufficient amount of a monomer selected from the group described above to obtain said range of solubility parameters. Suitable aromatic monomers include styrene, vinyl toluene, $\alpha$-methyl styrene, the various alkyl substituted styrenes such as t-butyl styrene, and mixtures thereof.

The proportion of the monomer having a higher solubility parameter than styrene will vary depending on the specific monomer used. However, solubility parameters, as defined in this application, are readily determined and one skilled in the art should have no difficulty in determining the proper proportions of any one comonomer.

For example, a copolymer of 96% styrene and 4% acrylonitrile has a solubility parameter of about 9.3 and the parameter is raised to about 9.7 by increasing the proportion of acrylonitrile from 4% to about 18%. Further, it requires only about 2% maleimide (98% styrene) for a parameter of about 9.3 and about 9% (91% styrene) to raise the parameter to about 9.8.

A preferred copolymer is prepared from about 78 to about 97 percent by weight styrene and correspondingly from about 22 to about 3 percent by weight maleic anhydride to span the solubility parameter range of about 9.3 to 9.9.

The copolymers of this invention are readily made by methods well known to the art and need not be detailed herein, since it is the utilization of the copolymers, not their preparation which is important to this invention.

The thermoplastc copolymer may be admixed or blended with the blowing agent, but benefically the blowing agent is added to the extruder during the extrusion process. The direct addition of the blowing agent to the extruder results in a readily controlled quantity of blowing agent and permits a more uniform product to be obtained. Preferably the thermoplastic resin is heated to about 120° C. to 175° C. prior to extrusion from the orifice.

Usually in the preparation of thin sheets it is advantageous to extrude the molten, foamable, thermoplastic copolymer in the form of a thin tube and subsequently expand the tube by the application of internal fluid pressure thereto. The resultant blown tube is flattened and the edges trimmed to provide thin sheets of the cellular article. Such sheets are particularly useful as packaging material.

The invention is illustrated but not limited by the following examples.

A series of styrene-maleic anhydride copolymers were prepared to contain up to 32 percent by weight maleic anhydride. The polymers were explosively foamed by placing 3 grams of the copolymer and 2 cc. of Freon 11 in a heavy walled glass ampoule. The main portion of the ampoule was cooled in a dry ice bath containing a 60/40 mixture of chloroform/trichloroethylene until the ampoule was heat sealed. The sealed ampoule was then placed in a metal jacket and heated to 140° C. for 2–3 hours to allow the blowing agent and the copolymer to equilibrate. The metal jacket was then placed in an injection head where the ampoule was blown against a metal plate and ruptured allowing the polymer to foam. The results are shown below.

| Example | Weight percent maleic anhydride | Solubility parameter | Copolymer viscosity at 25° C.[1], cps. | Cell size |
|---|---|---|---|---|
| 1 | 0 | 9.18 | 17 | Too large. |
| 2 | 2.6 | 9.28 | 11.8 | Do. |
| 3 | 5.4 | 9.34 | 6.9 | Medium-large. |
| 4 | 10.5 | 9.46 | 8.7 | Do. |
| 5 | 15.2 | 9.73 | 3.7 | Medium [2]. |
| 6 | 21.0 | 9.90 | 4.1 | Do. |
| 7 | 32.0 | 10.0 | 3.4 | No foam. |

[1] 10% by wt. solution of the polymer in methyl ethyl ketone.
[2] Medium=approximately 0.6–1.0 mm.

The data show that Freon 11 produces an overly large cell size with polystyrene, but as the weight percent of maleic anhydride increases to a point sufficient to alter the solubility parameter of the copolymer as previously described, good foam can be made using Freon 11 as the blowing agent.

A similar correlation between good foaming ability and an increase in the solubility parameter of the copolymer to the range previously specified is found with styrene/acrylonitrile copolymers and styrene/maleimide copolymers.

What is claimed is:

1. A process for producing a cellular plastic article which comprises heating and extruding into a region of lower pressure, a thermoplastic copolymer composition containing trichlorofluoromethane as a volatile foaming agent; said composition heated to a temperature sufficient to cause foaming; and said copolymer containing in chemically combined form, a monovinyl non-halogenated aromatic monomer and an amount of a comonomer sufficient to provide a copolymer having a solubility parameter of about 9.3 to 9.9, said comonomer selected from the group consisting of acrylonitrile, methacrylonitrile, methyl acrylate, methyl methacrylate, acrylic acid, methacrylic acid, $\alpha,\beta$-unsaturated cyclic anhydrides and their hydrolyzed alkali metal salts, maleimide, monochlorostyrene, dichlorostyrene, and mixtures thereof.

2. The process of claim 1 including the step of adding said foaming agent to the copolymer composition during the extrusion thereof.

3. The process of claim 1 wherein the copolymer contains from about 78 to 97 percent by weight styrene and from about 22 to 3 percent by weight maleic anhydride.

4. The process of claim 1 wherein the aromatic monomer is styrene.

5. The process of claim 1 wherein the cyclic anhydride is maleic anhydride.

6. The process of claim 1 wherein the copolymer contains from about 82 to 96 percent by weight styrene and about 18 to 4 percent by weight of acrylonitrile.

7. The process of claim 1 wherein the copolymer contains from about 91 to 98 percent by weight styrene and from 9 to about 2 percent by weight maleimide.

References Cited

UNITED STATES PATENTS 3,018,257  1/1962  Spencer _____ 260—2.5(B)
3,322,695,  5/1967  Alfrey et al. _____ 260—2.5

MURRAY TILLMAN, Primary Examiner

W. J. BRIGGS, Sr., Assistant Examiner

U.S. Cl. X.R.

260—33.8, 78.5, 85.5, 86.7, 87.5, 88.1